United States Patent Office 3,010,938
Patented Nov. 28, 1961

3,010,938
STABILIZATION OF ORGANIC COMPOSITIONS WITH METAL DEACTIVATORS
Ronald B. Spacht, Kent, Ohio, assignor to The Goodyear Tire & Rubber Company, Akron, Ohio, a corporation of Ohio
No Drawing. Filed June 8, 1959, Ser. No. 818,526
16 Claims. (Cl. 260—45.9)

The present invention relates to the stabilization of organic substances with metal deactivators. More particularly, it is concerned with the stabilization of organic substances which are subject to oxidative deterioration in the presence of a metal containing material which catalyzes the deterioration by the addition of small amounts of new, highly effective metal deactivators. Although the invention is particularly applicable to the stabilization of natural and synthetic rubbers, the newly discovered metal deactivating properties of the compounds to be fully described hereinafter may be also used to prevent oxidative deterioration of gasoline and other liquid fuels, lubricants, fats and oils, resins and other organic substances.

Many organic substances, and particularly rubber, unsaturated hydrocarbons, fats and oils, and many resins, are subject to the hazard of deterioration due to oxidation. This oxidation, in the case of rubbers, leads to loss of tensile strength, resiliency and other desired properties. Similarly, such oxidative deterioration destroys to a substantial extent many desired properties in other organic substances. The rate of the oxidative deterioration is usually increased when the organic substance is subjected to elevated temperatures or exposed to sunlight or other actinic light. However, a much greater increase in the deterioration is often brought about by the accidental inclusion of extraneous metallic materials in the organic substances. Thus, copper, manganese or iron metal or the salts thereof are inherently catalytic to the oxidation of most organic materials, and very small amounts of these metals or their salts often occur as impurities in organic compositions. The simple passage of organic compounds through metal pipe or tubing is often sufficient to cause enough metal or metal salt to be accidentally included in the organic composition.

The catalytic effect of metal containing materials upon the oxidative deterioration of organic substances has been recognized for many years. Various expedients have been employed to mitigate the catalytic effect of metal containing materials, and probably the most successful approach to the solution of this problem has been the discovery and use of materials which in some fashion or other serve to deactivate the catalytic effect of the metal containing materials, and accordingly help to stabilize the metal contaminated organic substances against oxidative deterioration. A substantial number of these so-called metal deactivators have been developed and have been described in the technical literature and patents, for example, see U.S. Patents 2,533,205, 2,530,650 and 2,783,210. The search continues, however, for additional compounds which can effectively be used as metal deactivators in organic substances, particularly such materials which will be more efficient than the metal deactivators previously known, possess little or no tendency to discolor the organic substances to which they are added, have low toxicity, and have freedom from strong or objectionable ordors.

A principal object of the present invention is the provision of new methods for the protection of organic substances against oxidative deterioration which is accelerated by the presence in the substance of small amounts of metal containing materials, particularly, Cu, Co, Mn, Fe metal or salts. Further objects include:

(1) Provision of new means for deactivation of catalytic metals in organic substances to help retard oxidative deterioration of the substances and thereby stabilize them.

(2) The provision of new metal deactivators particularly useful in the stabilization of elastomeric materials, and which produce very little discoloration in white or light colored formulations of the elastomer.

(3) Provision of new and improved metal deactivators for use in inhibiting the deterioration of organic substances in the presence of metallic materials which normally tend to catalyze the oxidative deterioration of the organic substance.

(4) Provision of new compositions comprising an organic substance subject to oxidative deterioration, e.g., natural or synthetic rubber, gasoline, lubricating oils or greases, fuel oils, resins, fats and waxes, contaminated with an oxidation catalyzing metal or metal compound, and new, highly effective metal deactivators for inhibiting the catalytic effect of the metal or metal compounds on the oxidative deterioration.

(5) Provision of new metal deactivators particularly useful in stabilization of elastomeric materials or other organic compositions subject to contact with aqueous media because of very low water solubility of the metal deactivators, which prevents the metal deactivators from being leached from the organic compositions by contact with water or other aqueous media.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are accomplished in accordance with the present invention by the addition of small amounts of β-(2-hydroxy aryl)-α-cyano acrylamides to organic compositions so as to act as metal deactivators in the compositions. It has been found that the addition of such acrylamides deactivates or suppresses the effects of contaminating metal components of the compositions, thereby inhibiting the catalytic acceleration of the oxidative deterioration of the organic substances in the compositions.

Normally, the organic composition which is to be protected against oxidative deterioration will include an anti-oxidant which has the property to retard oxidation naturally occurring, regardless of the presence of the contaminating metal material. However, the efficiency and overall results of such anti-oxidants, which are sometimes also referred to as gum inhibitors, is seriously retarded by the catalytic activity of the metal component. It has been discovered that β-(2-hydroxy aryl)-α-cyano acrylamides of this invention may be incorporated in organic compositions to permit anti-oxidants, gum inhibitors, or the like, to perform their normal oxidative deterioration function, while at the same time, any acceleration in oxidation of the organic composition caused by the presence therein of the catalytic metal containing materials is substantially suppressed by the presence of the acrylamides.

The preferred β-(2-hydroxy aryl)-α-cyano acrylamides for use as metal deactivators in accordance with this invention are those with the following structure:

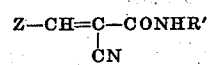

wherein Z is a radical selected from the group consisting of those having the structure:

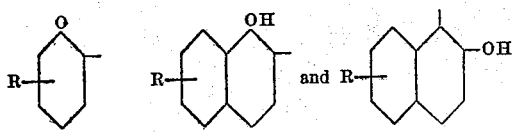

R is a hydrogen, alkyl, alkoxy, halogen or hydroxyl radical and

R' is a hydrogen or alkyl radical.

Most effective results are obtained by the use of such compounds wherein R is a hydrogen, hydroxyl, halogen, a one to six carbon atom alkyl, or a one to six carbon alkoxy, and R' is hydrogen. However, where R' is a $C_1$ to $C_{10}$ alkyl radical, the compounds are also useful metal deactivators. From among this group of compounds, β-(2-hydroxy phenyl)-α-cyano acrylamide and β-(2-hydroxy-β-naphthyl)-α-cyano acrylamide have been found to be particularly effective.

Examples of β-hydroxy alkaryl-α-cyano acrylamides which may be employed as metal deactivators include the 3-methyl, 3-ethyl, 3-isobutyl, 4-methyl, 4-amyl, 4-dodecyl, 5-methyl, 5-ethyl, 5-hexyl, 5-isobutyl, 5-n-propyl, 5-(2,2-diethyl ethyl)- and 5-octyl substituted β-(2-hydroxy phenyl)-α-cyano acrylamides; the 3-methyl, 3-ethyl, 5-methyl, 5-ethyl, 5-butyl, 7-methyl, 7-ethyl, 7-hexyl substituted β-(1-hydroxy-β-naphthyl)-α-cyano acrylamides and the 3-methyl, 3-ethyl, 3-amyl, 5-methyl, 5-n-propyl, 5-octyl, 7-methyl, 7-ethyl and 7-hexyl substituted β-(2-hydroxy-α-naphthyl)-α-cyano acrylamides.

Examples of usable hydroxy β-alkoxy aryl-α-cyano acrylamides include 3-methoxy, 3-ethoxy, 3-n-propoxy, 4-methoxy, 4-ethoxy, 4-hexyloxy, 4-dodecyloxy, 5-methoxy, 5-ethoxy, 5-iso-butoxy and 5-hexyloxy substituted β-(2 hydroxy phenyl)-α-cyano acrylamides; the 3-methoxy, 3-ethoxy, 3-butoxy, 5-methoxy, 5-butoxy, 5-hexyloxy, 7-methoxy, 7-ethoxy, 7-butoxy, 7-dodecyloxy substituted β-(1-hydroxy-β-naphthyl)-α-cyano acrylamides and the 3-methoxy, 3-ethoxy, 3-hexyloxy, 5-methoxy, 5-ethoxy, 5-isopropoxy, 7-methoxy, 7-sec. butoxy, 7-pentanoxy, 7-hexyloxy, and 7-octyloxy substituted β-(2-hydroxy-α-naphthyl)-α-cyano acrylamides.

Examples of β-haloaryl-α-cyano acrylamides which may be used as metal deactivators include 3-chloro, 3-bromo, 4-fluoro, 4-chloro, 4-iodo, 5-chloro, 6-chloro and 6-bromo substituted β-(2-hydroxy phenyl)-α-cyano acrylamides; 3-chloro, 3-fluoro, 5-chloro, 7-iodo, 7-bromo and 7-chloro substituted β-(1-hydroxy-β-naphthyl)-α-cyano acrylamides and 3-chloro, 3-bromo, 5-chloro, 7-fluoro, 7-iodo, 7-chloro and 7-bromo substituted β-(2-hydroxy-α-naphthyl)-α-cyano acrylamides.

Examples of β-dihydroxy aryl-α-cyano acrylamides usable in the operations of the invention include 2,3-dihydroxy phenyl; 2,4-dihydroxy phenyl; 2,6-dihydroxy phenyl; 2,3-dihydroxy-α-naphthyl; 2,6-dihydroxy-α-naphthyl; 2,7-dihydroxy-α-naphthyl; 1,3-dihydroxy-β-naphthyl; 1,5-dihydroxy-β-naphthyl; 1,6-dihydroxy-β-naphthyl; 1,7-dihydroxy-β-naphthyl and 1,8-dihydroxy-β-naphthyl β-substituted α-cyano acrylamides.

In addition to the above compounds, the N-alkyl substituted derivatives thereof may be used as metal deactivators, e.g., N-dodecyl-β-(2-hydroxy phenyl)-α-cyano acrylamide, N-isobutyl β-(2-hydroxy-β-naphthyl)-α-cyano acrylamide, N-hexyl β-(1-hydroxy-α-naphthyl)-α-cyano acrylamide, N-ethyl β-(2-hydroxy-3-methyl phenyl)-α-cyano acrylamide, N - methyl β - (2-hydroxy-5-ethoxy phenyl)-α-cyano acrylamide, N-n-propyl β-(2-hydroxy-4-chlorophenyl)-α-cyano acrylamide and N-octyl β-(2,6-dihydroxy phenyl)-α-cyano acrylamide.

In addition to the individual compounds of the type listed above, mixtures of these may be used as metal deactivators in accordance with the invention. Furthermore, mixtures of these compounds with other compatible known metal deactivators in order to obtain special deactivating effects with particular metal impurities or with particular oxidizable organic substances may also be used.

The hydroxy aryl α-cyano acrylamides used as metal deactivators in accordance with the present invention may be prepared in several ways. However, it has been found that these compounds may be prepared in good yields by the reaction of the pertinent hydroxy aryl aldehyde with cyano acetamide or the N-alkyl substituted cyano acetamide in aqueous reaction media in the presence of caustic alkali as reported by Curtis et al. in J. Chem. Soc. 123, 3130–40 (1923).

EXAMPLES

A more complete understanding of the novel compositions and matter and their method of preparation may be had by reference to the following examples, in which all parts or percentages are by weight unless otherwise specified.

Example 1

In a suitable reaction vessel equipped with an agitator, 100 parts of cyano acetamide are dissolved in 600 parts of water. To this solution there is then added 100 parts of salicyl aldehyde and 2 parts of a 50% aqueous solution of potassium hydroxide. The whole mixture is then vigorously stirred for three hours, during which time the maximum temperature reached is 40° C. Crystals of reaction product start to separate in about the first hour of stirring. At the end of the three hour reaction period, the reaction product is recovered by filtration. The yield is 205 parts of a crystalline product having a melting point of 189–190° C., with decomposition.

Example 2

A solution is formed by dissolving 400 parts of butadiene-styrene rubber (SBR–1006) in 4000 parts of benzene and then further dissolving therein the following ingredients:

| | Parts |
|---|---|
| Styrenated phenol rubber anti-oxidants | 5 |
| Ferric stearate | 0.012 |

The resulting solution is divided into four equal portions and one of these is poured onto and alowed to flow out on a sheet of aluminum foil. The benzene is then evaporated at room temperature from the thin film of solution, forming a thin layer of unvulcanized rubber composition. This thin layer is next stripped from the aluminum foil and several small, rectangular samples are cut from the stripped film. After being weighed, the samples are placed in an oxygen absorption apparatus and tested for oxygen absorption at 90° C., in accordance with the standardized test reported at "Industrial and Engineering Chemistry," vol. 38, p. 71 (1946).

Example 3

There is dissolved in the second of the four equal portions of rubber solution of Example 2, one part of the reaction product of Example 1. Rectangular samples of rubber film from the resulting solution are prepared and tested for oxygen absorption, following the procedure of Example 2.

Example 4

The operations of Example 3 are repeated with the third of the solution portions from Example 2 and one part of mercapto benzimidazole (a commercially available metal deactivator) in place of the reaction product of Example 1.

Example 5

The operations of Example 3 are repeated with the last of the solution portions and two parts of disalicylal propylene diamine (a commercially available metal deactivator) in place of the reaction product of Example 1.

The average oxygen absorption values of the examples prepared and tested in each of the Examples 2 to 5 are reported in the following table:

TABLE I

| Product of Example | Hours to 2% oxygen | Percent Improvement |
| --- | --- | --- |
| 2 | 14 | |
| 3 | 200 | 2760 |
| 4 | 22 | 57 |
| 5 | 32 | 129 |

*Example 6*

A standard tread stock formulation is prepared using oil-extended butadiene-styrene rubber. This tread stock batch is divided into three portions, and to one of these is added 2% by weight of the reaction product of Example 1. To the second portion there is added 2% by weight of disalicylal propylene diamine. Separate batches are then extruded into test strips and subjected to standard static weather cracking and ozone deterioration tests. The results of these tests are reported in the following table:

TABLE II

| Sample | Static Weather Cracking Rating | Ozone Resistance Rating |
| --- | --- | --- |
| No metal deactivator | 10 | 10 |
| β-(2-hydroxyl phenyl)-α-cyano acrylamide | 1 | 1 |
| disalicylal propylene diamine | 5 | 8 |

The ratings in columns two and three above are relative ratings, the samples with the least cracks and best appearance being designated 1 and those with very bad cracks being designated 10, and the other samples rated relative thereto.

*Example 7*

A sample of a thermally cracked, blended gasoline is subjected to a standard oxygen bomb stability test (SAEJ, 24, 584, 1929) and the results are reported in accordance with the test as the induction period in minutes, namely 100 minutes.

To another sample of the same gasoline, there is added 0.01% of a gum inhibitor comprising 80% of N-n-butyl-4-aminophenol and 20% of N,N'-dibutyl-4-phenylene diamine. This inhibited gasoline is then subjected to the same stability test and found to possess an induction period of 580 minutes. With 2 p.p.m. of copper added to the inhibited gasoline, the induction period is found to be 170 minutes.

To another sample of the inhibited gasoline containing 2 p.p.m. of copper, 0.0005% of the metal deactivator produced in Example 1 is added and the resulting product is then subjected to the same stability test. In this case, the treated gasoline is found to have an induction period of 311 minutes.

As demonstrated by the above examples, the new metal deactivators of this invention are particularly useful in stabilizing synthetic rubber of the butadiene-styrene type. However, the new metal deactivators have been found to be useful in stabilizing all other types of elastomeric diene polymers, including natural rubber, butyl rubbers, acrylonitrile-butadiene polymers, polychloroprenes, as well as other elastomeric polymers, including acrylic ester polymers, vinyl ester elastomers and comparable polymeric materials whose oxidative deterioration is accelerated by presence therein of heavy metals or their compounds, particularly Cu, Co, Mn or Fe.

In addition to stabilization of rubbers as above indicated, the new metal deactivators appear ot be useful in stabilizing all other forms of organic substances which are subject to metal accelerated oxidative deterioration.

Aside from cracked gasoline as above reported, they may be used with hydrocarbon lubricants, vegetable and animal fats and oils, proteins, plasticizers or the like. The deactivators function in solutions of the organic substances as well as in undiluted mixtures.

The new metal deactivators may be incorporated in the organic substances in any suitable manner. The amount needed is very small and will depend to some extent upon the material being stabilized and the amount of contaminating heavy metal compound in the material. With natural and synthetic rubber, the deactivator will be used in about 0.05 to 5 parts per 100 parts of rubber. With gasoline, 5 to 50 p.p.m. are effective. Simple tests will indicate the effective amount to be used in stabilization of any organic composition in question. Generally ten times the weight of deactivator is used per unit weight of contaminating metal in the organic substance to be stabilized.

Normally, the new metal deactivators will be used in conjunction with small amounts of other stabilizing or preserving agents, e.g., anti-oxidants, gum inhibitors or the like. The above examples illustrate this with use of anti-oxidants in rubber compositions. Typical augmenting materials include hindered phenols, both monohydric and polyhydric, e.g., dibutyl cresol, bisphenols, butylated octyl phenols; diphenyl amines, e.g., p-isopropoxy diphenylamine; octylated diphenylamines; polyalkyl polyphenols; monoethers of hydroquinone, e.g., hydroquinone monobenzyl ether; p-phenylene diamines, e.g., diphenyl p-phenylene diamine, di-secondary butyl phenylene diamine, di-β-naphthyl-p-phenylene diamine; alkylated phenols; aminophenols, e.g., N-butyl-4-aminophenol, N-methyl-2-dodecyl-4-aminophenol; naphthylamines, e.g., phenyl-β-naphthylamine, aldol-α-naphthylamine; alkyl or aryl phosphites, e.g., tri(p-nonyl phenyl) phosphite, and similar anti-oxidants, gum inhibitors or the like well known to the art. Furthermore, the new metal deactivators may be used in combination, if desired, with any other known metal deactivators, such as those disclosed in the aforementioned U.S. patents. Usually, the supplemental agents will be employed in an amount between 0.0001 and 10 parts per 100 parts of organic substance to be stabilized, e.g., in rubber compositions between about 0.5 and 5% by weight of anti-oxidant will be used with 0.05 to 5% of the metal deactivator.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A method of stabilizing a composition comprising an organic material selected from the group consisting of elastomeric diene polymers, hydrocarbon fuels, hydrocarbon lubricants, and vegetable and animal fats and oils subject to oxidative deterioration in the presence of a metal containing material which catalyzes said deterioration, which comprises adding thereto a small amount of a metal deactivator comprising a compound having the structure:

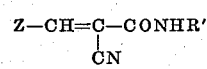

wherein Z is a radical selected from the group consisting of those having the structure:

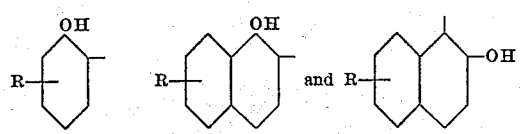

R is a radical selected from the group consisting of hydrogen, one to twelve carbon atom alkyl, one to twelve carbon atom alkoxy, halogen, said hydroxyl and R' is a radical selected from the group consisting of hydrogen and one to twelve carbon atom alkyl.

2. A method of stabilizing a composition comprising an organic material selected from the group consisting of elastomeric diene polymers, hydrocarbon fuels, hydrocarbon lubricants, and vegetable and animal fats and oils subject to oxidative deterioration in the presence of a metal containing material which catalyzes said deterioration, which comprises adding thereto a small amount of a metal deactivator comprising a compound having the structure:

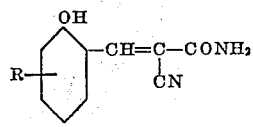

wherein R is a radical selected from the group consisting of hydrogen, $C_1$ to $C_6$ alkyl, $C_1$ to $C_6$ alkoxy, halogen and hydroxyl.

3. A method as claimed in claim 1 wherein said organic material comprises predominantly an elastomeric diene polymer and the metal deactivator is present in about 0.05 to 5 parts by weight per 100 parts of said polymer.

4. A method as claimed in claim 3 wherein the composition contains an effective amount of an anti-oxidant.

5. A method as claimed in claim 1 wherein said organic material is a gasoline and the metal deactivator is present in about 5 to 50 p.p.m. by weight of the gasoline.

6. A method as claimed in claim 5 wherein said composition contains an effective amount of a gum inhibitor.

7. A method of stabilizing compositions comprising an organic material selected from the group consisting of elastomeric diene polymers, hydrocarbon fuels, hydrocarbon lubricants, and vegetable and animal fats and oils subject to oxidative deterioration in the presence of a metal containing material which catalyzes said deterioration, which comprises adding thereto as a metal deactivator a small amount of β-(2-hydroxyphenyl)-α-cyano acrylamide.

8. A method of stabilizing a composition comprising an organic material selected from the group consisting of elastomeric diene polymers, hydrocarbon fuels, hydrocarbon lubricants, and vegetable and animal fats and oils subject to oxidative deterioration in the presence of a metal containing material which catalyzes said deterioration, which comprises adding thereto a small amount of a metal deactivator comprising a compound having the structure:

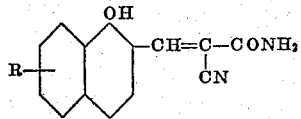

wherein R is a radical selected from the group consisting of hydrogen, $C_1$ to $C_6$ alkyl, $C_1$ to $C_6$ alkoxy, halogen and hydroxyl.

9. A method of stabilizing compositions comprising an organic material selected from the group consisting of elastomeric diene polymers, hydrocarbon fuels, hydrocarbon lubricants, and vegetable and animal fats and oils subject to oxidative deterioration in the presence of a metal containing material which catalyzes said deterioration, which comprises adding thereto as a metal deactivator a small amount of β-(2-hydroxy naphthyl)-α cyano acrylamide.

10. A composition comprising an organic material selected from the group consisting of elastomeric diene polymers, hydrocarbon fuels, hydrocarbon lubricants, and vegetable and animal fats and oils which is subject to oxidative deterioration in the presence of a metal containing material which catalyzes said deterioration and a small amount of a metal deactivator having the structure:

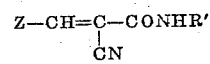

wherein Z is a radical selected from the group consisting of those having the structure:

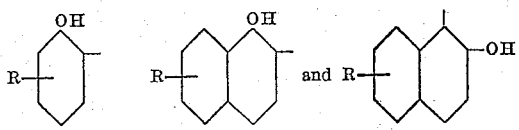

R is a radical selected from the group consisting of hydrogen, one to twelve carbon atom alkyl, one to twelve carbon atom alkoxy, halogen and hydroxyl and R' is a radical selected from the group consisting of hydrogen and one to twelve carbon atom alkyl.

11. A composition comprising an organic material selected from the group consisting of elastomeric diene polymers, hydrocarbon fuels, hydrocarbon lubricants, and vegetable and animal fats and oils which is subject to oxidative deterioration in the presence of a metal containing material which catalyzes said deterioration and a small amount of a metal deactivator having the structure:

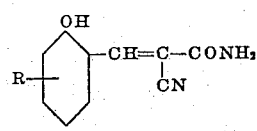

wherein R is a radical selected from the group consisting of hydrogen, $C_1$ to $C_6$ alkyl, $C_1$ to $C_6$ alkoxy, halogen and hydroxyl.

12. A composition comprising an organic material selected from the group consisting of elastomeric diene polymers, hydrocarbon fuels, hydrocarbon lubricants, and vegetable and animal fats and oils which is subject to oxidative deterioration in the presence of a metal containing material which catalyzes said deterioration and a small amount of a metal deactivator having the structure:

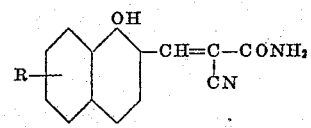

wherein R is a radical selected from the group consisting of hydrogen, $C_1$ to $C_6$ alkyl, $C_1$ to $C_6$ alkoxy, halogen and hydroxyl.

13. An elastomeric composition comprising an elastomeric diene polymer, a metal salt which catalyzes oxidative deterioration of said polymer, an anti-oxidant and as a metal deactivator to inhibit the catalytic deterioration effect of said metal salt, a small amount of β-(2-hydroxy phenyl)-α-cyano acrylamide.

14. An elastomeric composition comprising an elastomeric diene polymer, a metal salt which catalyzes oxidative deterioration of said polymer, an anti-oxidant and as a metal deactivator to inhibit the catalytic deterioration effect of said metal salt, a small amount of β-(2-hydroxy naphthyl)-α-cyano acrylamide.

15. A stabilized gasoline comprising a gum inhibitor and a small amount of β-(2-hydroxy phenyl)-α-cyano acrylamide.

16. A stabilized elastomeric diene polymer comprising an anti-oxidant and as a metal deactivator, a small amount of a β-(2-hydroxy aryl)-α-cyano acrylamide.

References Cited in the file of this patent
UNITED STATES PATENTS 2,573,779     Walters _____ Nov. 6, 1951

OTHER REFERENCES

Journal of the Chemical Society, Gurney and Jackson, pub., London (1923, vol. 123, pp. 3130–40, article by Curtis et al.

UNITED STATES PATENT OFFICE
CERTIFICATION OF CORRECTION

Patent No. 3,010,938                               November 28, 1961

Ronald B. Spacht

It is hereby certified that error appears in the above numbered patent requiring correction and that the said Letters Patent should read as corrected below.

Column 3, lines 3 to 8, the first ring structure should appear as shown below instead of as in the patent:

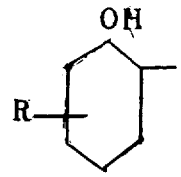

column 4, line 43, for "alowed" read -- allowed --; column 5, line 73, for "ot" read -- to --; column 7, line 3, for "said" read -- and --.

Signed and sealed this 12th day of June 1962.

(SEAL)
Attest:

ERNEST W. SWIDER
Attesting Officer

DAVID L. LADD
Commissioner of Patents